United States Patent
Andrew et al.

[15] 3,664,995
[45] May 23, 1972

[54] REACTIVE TRIAZINE CONTAINING DIAZO DYESTUFFS

[72] Inventors: Herbert Francis Andrew; Neville Jackson, both of Manchester, England

[73] Assignee: Imperial Chemical Industries Limited, London, England

[22] Filed: Dec. 22, 1969

[21] Appl. No.: 887,329

[30] Foreign Application Priority Data

Dec. 31, 1968 Great Britain......................61,961/68

[52] U.S. Cl......................260/146 T, 260/146 D, 260/147, 260/148, 260/150, 260/151, 260/153, 260/154, 260/158, 260/162, 260/163, 260/194, 260/195, 260/196, 260/198, 260/199, 260/205, 260/206, 260/249, 260/249.5, 260/249.8
[51] Int. Cl. .......................................................C09b 62/08
[58] Field of Search..........................................260/153, 146

[56] References Cited

UNITED STATES PATENTS 3,349,074 10/1967 Andrew................................260/146

*Primary Examiner*—Joseph Rebold
*Assistant Examiner*—Donald M. Papuga
*Attorney*—Cushman, Darby & Cushman

[57] ABSTRACT

Dyestuffs of the formula:

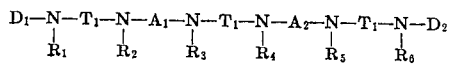

in which $D_1$ and $D_2$ are azo, anthraquinone or nitro dye radicals, $R_1$–$R_6$ are H or lower alkyl groups, $A_1$ and $A_2$ are radicals of the benzene or napthalene series and $T_1$ is a chloro-s-triazine radical, are reactive dyestuffs for cellulose having good fastness to light and washing. They are especially notable for the high proportion which reacts with the fibre when applied from saline dyebaths.

6 Claims, No Drawings

REACTIVE TRIAZINE CONTAINING DIAZO DYESTUFFS

This invention relates to new reactive dyestuffs of the triazine or pyrimidine series, useful for the coloration of cellulose textile materials.

The new dyestuffs are represented by the general formula:

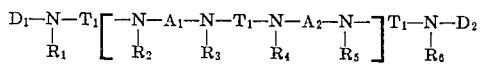
(1)

wherein each N has the usual meaning of a nitrogen atom, $R_1$, $R_2$, $R_3$, $R_4$, $R_5$ and $R_6$ may be the same or different and each represents a hydrogen atom or an alkyl group having up to 4 carbon atoms, $A_1$ and $A_2$ represent divalent radicals of the benzene or naphthalene series, more particularly phenylene or naphthylene radicals in which the benzene or naphthalene nuclei contain at least one sulphonic acid group and may otherwise be substituted, e.g. by Cl, $CH_3$ or COOH.

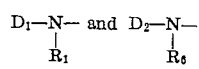

represent the radicals of the same or different water-soluble colored compounds of formula $D_1$–$NHR_1$, and $D_2$–$NHR_6$ in which $D_1$ and $D_2$ represent radicals of the anthraquinone, nitro or azo series, including monoazo or bis-azo dyestuffs which may in appropriate cases be in the form of complex metal derivatives.

$T_1$ represents a s-triazine radical wherein the triazine nucleus carries a cellulose-reactive chlorine atom.

The new dyestuffs can be obtained by reacting together, in an appropriate stepwise manner, the following intermediate compounds:

a. two moles of a diamine, or one mole of each of two different diamines of the formula:

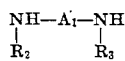
(2)

b. three moles of cyanuric chloride, and c. two moles of a water-soluble colored compound or one mole of each of two different colored compounds of the formula:

$$D_1 - NHR_1$$

As examples of compounds of formula $D_1$—NHR, there may be mentioned:

i. Anthraquinone compounds of the formula:

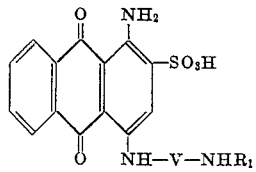
(3)

wherein the anthraquinone nucleus may contain an additional sulphonic acid group in the 5-, 6-, 7- or 8-position and V represents a bridging group which is preferably a divalent radical of the benzene series, for example phenylene, diphenylene or 4,4'-divalent stilbene or azobenezene radicals. It is preferred that V should contain one sulphonic acid group for each benzene ring present. $R_1$ has the meaning stated above.

ii. Monoazo compounds of the formula:

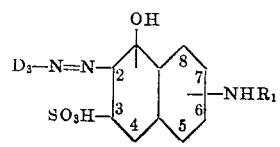
(4)

wherein $D_3$ represents a mono- or di- cyclic aryl radical which is free from azo groups and $NHR_1$ groups, the -$NHR_1$ group is preferably attached to the 6-, 7- or 8-position of the naphthalene nucleus, and which may contain a sulphonic acid group in the 5- or 6-position of the naphthalene nucleus.

$D_3$ may represent a radical of the napthalene or benzene series which is free from azo substituents, for example a stilbene, diphenyl, benzthiazolylphenyl or diphenylamine radical. Also in this class are to be considered the related dyestuffs in which the $NHR_1$ group, instead of being attached to the naphthalene nucleus, is attached to a benzoylamino or anilino group which is attached to the 6-, 7- or 8-position of the naphthalene nucleus.

Particularly valuable dyestuffs are obtained from those wherein $D_3$ represents a sulphonated phenyl or naphthyl radical, especially those which contain a —$SO_3H$ group in ortho position to the azo link; the phenyl radical may be further substituted for example, by halogen atoms such as chlorine, alkyl radicals such as methyl, acylamino groups such as acetylamino and alkoxy radicals such as methoxy.

iii. Disazo compounds of formula (4), wherein $D_3$ stands for a radical of the azobenzene, azonaphthalene or phenyl-azo-naphthalene series and the naphthalene nucleus is substituted by the $NHR_1$ group, and optionally by sulphonic acid as in class (ii).

iv. Monoazo compounds of the formula:

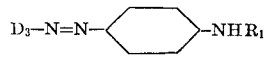
(5)

wherein $D_3$ stands for a mono or dicyclic aryl radical as described for class (ii) and is preferably a disulphonaphthyl or a stilbene radical; the benzene nucleus may contain further substituents such as halogen atoms, or alkyl, alkoxy, carboxylic acid and acylamino groups.

v. Mono- or dis-azo compounds of the formula:

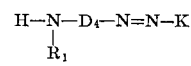
(6)

wherein $D_4$ represents an arylene radical such as a radical of the azobenzene, azonaphthalene or phenylazonaphthalene series, or, preferably, an at most dicyclic arylene radical of the benzene or naphthalene series, and K represents the radical of a naphthol sulphonic acid or the radical of an enolised or enolisable ketomethylene compound (such as an aceto-acetarylide or a 5-pyrazolone) having the OH group o- to the azo group. $D_4$ preferably represents a radical of the benzene series containing a sulphonic acid group.

vi. Mono- or dis-azo compounds of the formula:

$$D_3 - N = N - K_2 - NHR_1 \quad (7)$$

wherein $D_3$ represents a radical of the types defined for $D_3$ in classes (ii) and (iii) above and $K_2$ represents the radical of an enolisable ketomethylene compound (such as an acetoacetarylide or a 5-pyrazolone) having the —OH group in $\alpha$-position to the azo group.

vii. The metal complex, e.g. the copper, chromium and cobalt complex, compounds of those dyes of formulas 4, 6 and 7 (wherein $D_3$, $D_4$, K and $K_2$ have all the respective meanings stated) which contain a metallisable (for example, a hydroxyl, lower alkoxy or carboxylic acid) group ortho- to the azo group in $D_3$ or $D_4$.

viii. Nitro dyestuffs of the formula:

$$B_1 - NH - B_2 - NHR_1 \quad (8)$$

wherein $R_1$ and $R_2$ represent monocyclic aryl nuclei, the nitro group in $B_1$ being ortho to the NH group.

As examples of compounds of classes (i) to (viii) there may be mentioned:

In Class (i)

1-amino-4-(4'-aminoanilino)anthraquinone-2,3'-disulphonic acid.

1-amino-4-(4'-methylaminoanilino)anthraquinone-2:3'-disulphonic acid.

1-amino-4-(3'-amino-2':4':6'-trimethylanilino) anthraquinone-2,5'-disulphonic acid.

In Class (ii)
  6-amino-1-hydroxy-2-(2'-sulphophenylazo)naphthalene-3-sulphonic acid,
  8-amino-1-hydroxy-2-(2'-sulphophenylazo)naphthalene-3:6-disulphonic acid,
  7-amino-2(2':5'-disulphophenylazo)-1-hydroxynaphthalene-3-sulphonic acid,
  7-methylamino-2-(2'-sulphophenylazo)-1-hydroxynaphthalene-3-sulphonic acid,
  7-methylamino-2-(4'-methoxy-2'-sulphophenylazo)-1-hydroxynaphthalene-3-sulphonic acid,
  8-(3'-aminobenzoylamino)1-hydroxy-2-(2'-sulphophenylazo)naphthalene-3:6-disulphonic acid,
  8-amino-1-hydroxy-2:2'-azonaphthalene-1':3:5'-6-tetrasulphonic acid,
  6-amino-1-hydroxy-2-(4'-acetylamino-2'-sulphophenylazo)naphthalene-3-sulphonic acid,
  6-methylamino-1-hydroxy-2-(4'-methoxy-2'-sulphophenylazo)naphthalene-3-sulphonic acid,
  8-amino-1-hydroxy-2-phenylazonaphthalene-3:6-disulphonic acid,
  8-amino-1-hydroxy-2:2'-azonaphthalene-1':3:6-trisulphonic acid,
  6-amino-1-hydroxy-2-(4'-methoxy-2'-sulphophenylazo)naphthalene-3-sulphonic acid,
  8-amino-1-hydroxy-2:2'-azonaphthalene-1':3:5'-trisulphonic acid,
  6-amino-1-hydroxy-2:2'-azonaphthalene-1',3,5'-trisulphonic acid,
  6-methylamino-1-hydroxy-2:2'-azonaphthalene-1':3:5'-trisulphonic acid,
  7-amino-1-hydroxy-2:2'-azonaphthalene-1':3-disulphonic acid,
  8-amino-1-hydroxy-2-(4'-hydroxy-3'-carboxyphenylazo)naphthalene-3:6-disulphonic acid,
  6-amino-1-hydroxy-2-(4'-hydroxy-3'-carboxyphenylazo)naphthalene-3:5-disulphonic acid.
In Class (iii)
  8-amino-1-hydroxy-2-[4'-(2''-sulphophenlazo)-2'-methoxy-5'-methylphenylazo]naphthalene-3:6-disulphonic acid,
  6-amino-1-hydroxy-2-[4'-(2''-sulphophenylazo)-2'-methoxy-5'-methylphenylazo]naphthalene-3:5-disulphonic acid.
In Class (iv)
  2-(4'-amino-2'-methylphenylazo)naphthalene-4:8-disulphonic acid,
  2-(4'-amino-2'-acetylaminophenylazo)naphthalene-5:7-disulphonic acid,
  2-(4'-amino-2'-ureidophenylazo)naphthalene-3:6:8-trisulphonic acid,
  4-nitro-4'-(4''-methylaminophenylazo)stilbene-2:2'-disulphonic acid,
  4-nitro-4'-(4''-amino-2''-methyl-5''-methoxyphenylazo)stilbene-2:2'-disulphonic acid,
  2-(4'-amino-2'-acetylaminophenylazo)naphthalene-4:8-disulphonic acid,
  4-amino-2-methylazobenzene-2':5'-disulphonic acid.
In Class (v)
  1-(2',5'-dichloro-4'-sulphophenyl)-3-methyl-4-(3''-amino-4''-sulphophenylazo)-5-pyrazolone,
  1-(4'-sulphophenyl)-3-carboxy-4-(4''-amino-3''-sulphophenylazo)-5-pyrazolone,
  1-(2'-methyl-5'-sulphophenyl)-3-methyl-4-(4''-amino-3''-sulphophenylazo)-5-pyrazolone,
  1-(2'-sulphophenyl)-3-methyl-4-(3''-amino-4''-sulphophenylazo)-5-pyrazolone,
  4-amino-4'-(3''-methyl-1''-phenyl-4''-pyrazol-5''-onyl)stilbene-2:2'-disulphonic acid,
  4-amino-4'-(2''-hydroxy-3'',6''-disulpho-1''-naphthlazo)stilbene-2:2'-disulphonic acid,
  8-acetylamino-1-hydroxy-2-(3'-amino-4'-sulphophenylazo)naphthalene-3:6-disulphonic acid,
  7-(3'-sulphophenylamino)-1-hydroxy-2-(4'-amino-2'-carboxyphenylazo)-naphthalene-3-sulphonic acid,
  8-phenylamino-1-hydroxy-2-(4'-amino-2'-sulphophenylazo)naphthalene-3:6-disulphonic acid,
  6-acetylamino-1-hydroxy-2-(5'-amino-2'-sulphophenylazo)naphthalene-3-sulphonic acid,
  6-ureido-1-hydroxy-2-(5'-amino-2'-sulphophenylazo)-naphthalene-3-sulphonic acid,
  8-benzoylamino-1-hydroxy-2-(5'-amino-2'-sulphophenylazo)naphthalene-3:6-disulphonic acid,
  1-(4':8'-disulphonaphth-2'-yl)-3-methyl-4-(5''-amino-2''-sulphophenylazo)-5-pyrazolone,
  1-(2'-sulphophenyl)-3-carboxy-4-(5''-amino-2''-sulphophneylazo)-5-pyrazolone,
  1-(2':5'-dichloro-4'-sulphophenyl)-3-methyl-4-(5''-amino-2''-sulphophenylazo)-5-pyrazolone.
In Class (vi)
  1-(3'-aminophenyl)-3-methyl-4-(2':5'-disulphophenylazo)-5-pyrazolone,
  1-(3'-aminophenyl)-3-carboxy-4-(2'-carboxy-4'-sulphophenylazo)-5-pyrazolone,
  4-amino-4'-[3''-methyl-4''-(2''':5''''-disulphophenylazo)-1''-pyrazol-5''-onyl]stilbene-2:2'-disulphonic acid,
  1-(3'-aminophenyl)-3-carboxy-4-[4''-(2''':5'''-disulphophenylazo)-2''-methoxy-5''-methylphenylazo]-5-pyrazolone,
In Class (vii)
  The copper complex of 8-amino-1-hydroxy-2-(2'-hydroxy-5'-sulphophenylazo)naphthalene-3:6-disulphonic acid,
  The copper complex of 6-amino-1-hydroxy-2-(2'-hydroxy-5'-sulphophenylazo)naphthalene-3-sulphonic acid,
  The copper complex of 6-amino-1-hydroxy-2-(2'-hydroxy-5'-sulphophenylazo)naphthalene-3:5-disulphonic acid,
  The copper complex of 8-amino-1-hydroxy-2-(2'-hydroxy-3'-chloro-5'-sulphophenylazo)naphthalene-3:6-disulphonic acid,
  The copper complex of 8-amino-1-hydroxy-2-[4'-(2''-sulphophenylazo)-2'-methoxy-5'-methylphenylazo]naphthalene-3:6-disulphonic acid,
  The copper complex of 6-amino-1-hydroxy-2-[4'-(2'':5''-disulphophenylazo)-2'-methoxy-5'-methylphenylazo]naphthalene-3,5-disulphonic acid,
  The copper complex of 1-(3'-amino-4'-sulphophenyl)-3-methyl-4-[4''-(2''':5'''-disulphophenylazo)-2''-methoxy-5''-methylphenylazo]-5-pyrazolone,
  The copper complex of 7-(4'-amino-3'-sulphoanilino)-1-hydroxy-2-[4''-(2''':5'''-disulphophenylazo)-2''-methoxy-5''-methylphenylazo]naphthalene-3-sulphonic acid,
  The copper complex of 6-(4'-amino-3'-sulphoanilino)-1-hydroxy-2-(2''-carboxyphenylazo)naphthalene-3-sulphonic acid,
  The 1:2-chromium complex of 7-amino-6'-nitro-1:2'-dihydroxy-2:1'-azonaphthalene-3:4'-disulphonic acid,
  The 1:2-chromium complex of 6-amino-1-hydroxy-2-(2'-carboxyphenylazo)-naphthalene-3-sulphonic acid,
  The 1:2-chromium complex of 8-amino-1-hydroxy-2-(4'-nitro-2'-hydroxyphenylazo)naphthalene-3:6-disulphonic acid,
  The 1:2-cobalt complex of 6-(4'-amino-3'-sulphoanilino)-1-hydroxy-2-(5''-chloro-2''-hydroxyphenylazo)naphthalene-3-sulphonic acid,
  The 1:2-chromium complex of 1-(3'-amino-4'-sulphophenyl)-3-methyl-4-(2''-hydroxy-4''-sulpho-1''-naphthylazo)-5-pyrazolone,
  The 1:2-chromium complex of 7-(4'-sulphoanilino)-1-hydroxy-2-(4''-amino-2''-carboxyphenylazo)naphthalene-3-sulphonic acid,
  The 1:2-chromium complex of 1-(3'-aminophenyl)-3-methyl-4-(4''-nitro-2''-carboxyphenylazo)-5-pyrazolone,
  The 1:2-chromium complex of 6-amino-6'-nitro-1:2'-dihydroxy-2:1'-azonaphthalene-3:4'-disulphonic acid,
  The 1:2-cobalt complex of 6-amino-6'-nitro-1:2'-dihydroxy-2:1'-azonaphthalene-3:4'-disulphonic acid,
  The 1:2-chromium complex of 8-amino-1-hydroxy-2-(2'-hydroxy-5'-nitrophenylazo)naphthalene-3:6-disulphonic acid,
  The 1:2-chromium complex of 1-(3'-aminophenyl)-3-methyl-4-(2''-carboxy-4''-sulphophenylazo)-5-pyrazolone, The 1:2-chromium complex of 8-amino-1-hydroxy-2-(2'-hydroxy-3'-nitro-5'-sulphophenylazo)naphthalene-3:6-disulphonic acid, The 1:2-cobalt complex of 8-amino-1-hydroxy-2-(2'-hydroxy-3'-nitro-5'-sulphophenylazo)naphthalene-3:6-disulphonic acid.

In Class (viii)

4-amino-2'-nitro-diphenylamino-3:4'-disulphonic acid.

As examples of diamines of formula (2) there may be mentioned:

1:4-phenylenediamine-2-sulphonic acid, 1:3-phenylenediamine-4-sulphonic acid, 2-methyl-1:4-phenylenediamine-6-sulphonic acid, 2-methyl-1:5-phenylenediamine-4-sulphonic acid, 2:6-diaminotoluene-4-sulphonic acid, 2-methyl-1:5-phenylenediamine-3-sulphonic acid, 4:4'-diamino stilbene-2:2'-disulphonic acid, 4,4'-diaminodiphenyl-3-sulphonic acid, 2:6-diaminonaphthalene-4:8-disulphonic acid and 1:4-diaminonaphthalene-2-sulphonic acid.

Condensation of the various intermediate compounds depicted under (a), (b), and (c) may be effected in a number of ways utilizing the known general reaction that the halogen atoms of cyanuric chloride can be replaced stepwise by condensation with amines at different temperatures in aqueous medium utilizing an acid-binding agent to neutralize the liberated hydrogen halide.

For dyestuffs which are symmetrical, the following procedure can be effected:

Step 1(a)

$$X-T-X + 2HNR_2-A_1-NHR_3 \rightarrow T_1(\!\!-\!\!NR_3-A_1-NHR_2)_2 \quad (9)$$

Step 1(b)

$$D_1-NHR_1 + X-T_1-X \rightarrow D_1-NR_1-T_1-X \quad (10)$$

Step 2

$$(9) + 2 \text{ moles of } (10) \rightarrow \text{dyestuff}$$

Alternatively, after step 1(a);

Step 2(a)

$$(9) + 2 \text{ moles of } X-T_1-X \rightarrow T_1(\!\!-\!\!NR_3-A_1-NR_2-T_1-X)_2 \quad (11)$$

followed by:

Step 3

$$(11) + 2 \text{ moles of } D_1-NHR_1 \rightarrow \text{dyestuff}$$

Yet a different procedure starts with step 1(b) above and continues:

Step 2(b)

$$(10) + NHR_2-A_1-NHR_3 \rightarrow D_1NR_1-T_1-NR_2-A_1-NHR_3 \quad (12)$$

Step 3(b)

$$(12)(2 \text{ moles}) + X-T_1-X \rightarrow \text{dyestuff}$$

Unsymmetrical dyestuffs are preferably obtained by a modification of this last procedure wherein two different species of compound (12) are manufactured by using different kinds of dyestuff compounds of formula $D_1$—NHR, and/or different kinds of diamines of formula (2) and condensing these two compounds with cyanuric chloride in stepwise manner. As mentioned above, this stepwise reaction can be generally controlled by use of temperature. Thus reaction of the first chlorine atom in cyanuric chloride with a primary aromatic amine can be effected at from 0° to 35°C. and the second at from 45° to 80°C.

The above process is illustrated but not limited by the following Examples in which parts and percentages are by weight:

EXAMPLE 1

To a stirred suspension of 3.7 parts of cyanuric chloride in 40 parts of acetone and 40 parts of crushed ice there is added a neutral solution of 12.2 parts of the trisodium salt of 2-(2'-ureido-4'-aminophenylazo)naphthalene-3:6:8-trisulphonic acid in 200 parts of water and the mixture is stirred for 1 hour at 0°–5°C. then neutralized to pH 7 with 10 parts of a 10 percent aqueous solution of sodium carbonate. A neutral solution of 4.2 parts of the sodium salt of 1:4-diaminobenzene-2-sulphonic acid in 100 parts of water is added to the above mixture and the latter is heated at 45°–50°C. for 3 hours, the pH being maintained at 7 by the addition of a 10 percent aqueous solution of sodium carbonate.

45 Parts of sodium chloride are added and the precipitate is filtered off. 13.3 Parts of the sodium salt of the monochlorotriazinyl compound so obtained are dissolved in 300 parts of water and the solution is added to a stirred suspension of 1.32 parts of cyanuric chloride in 20 parts of acetone, 20 parts of water and 40 parts of ice. The mixture is stirred a 5°–10°C. for 1 hour then neutralized to pH 7 with four parts of a 10 percent aqueous solution of sodium carbonate. The solution is heated to 45°–50°C. for 3 hours, the pH being maintained at 7 by further addition of a 10 percent aqueous sodium carbonate solution, 40 parts of sodium chloride and 40 parts of potassium chloride are added and the solution is diluted with ethanol. The precipitate is filtered off and is then dried.

The dyestuff composition so obtained contains 1.47 atoms of hydrolysable chlorine for each azo group present. When applied to cellulose textile materials in conjunction with a treatment with an acid-binding agent, the dyestuff yields reddish-yellow shades with good fastness to washing and to light.

The following table illustrates further Examples obtained in similar manner to Example 1 by condensing cyanuric chloride with one mole of the amino compound of column 2 and with one mole of the diamine of column 3 and condensing 2 moles of the resulting product with one mole of cyanuric chloride. The shade of material colored with the resulting dyestuff is stated in column 4.

| Example | Amino compound | Diamine | Shade |
| --- | --- | --- | --- |
| 2 | 2-N-methylamino-5-hydroxy-1':5':7-trisulpho-2':6-azonaphthalene | 1:4-diaminobenzene-2-sulphonic acid | Reddish orange. |
| 3 | 2-N-methylamino-5-hydroxy-6-(2'-sulpho-4'-methoxyphenylazo)naphthalene-7-sulphonic acid | 1:3-diaminobenzene-4-sulphonic acid | Scarlet. |
| 4 | 1-(4'-sulphophenyl)-3-carboxy-4-(3''-amino-6''-sulphophenylazo)-5-pyrazolone | 1:4-diaminobenzene-2-sulphonic acid | Greenish yellow. |
| 5 | 2-N-methylamino-5-hydroxy-1':5':7-trisulpho-2':6-azonaphthalene | 1:3-diaminobenzene-4-sulphonic acid | Reddish orange. |
| 6 | 2-(4'-amino-2'-ureidophenylazo)-naphthalene-3:6:8-trisulphonic acid | do | Reddish yellow. |
| 7 | 1-amino-8-hydroxy-2':7-azonaphthalene-1':3:6-trisulphonic acid | 1:4-diaminobenzene-2-sulphonic acid | Bluish red. |
| 8 | Copper complex of 2-amino-5-hydroxy-6-(2'-hydroxy-5'-sulphophenylazo)naphthalene-1:7-disulphonic acid | do | Rubine. |
| 9 | 2-(4'-amino-2'-ureidophenylazo)-naphthalene-3:6:8-trisulphonic acid | 1-amino-4-N-methylaminobenzene-3-sulphonic acid | Reddish yellow. |
| 10 | 1-amino-8-hydroxy-7-(2'-sulphophenylazo)naphthalene-3:6-disulphonic acid | 1:4-diaminobenzene-2-sulphonic acid | Red. |
| 11 | Copper complex of 1-amino-8-hydroxy-7-(2'-hydroxy-5'-amino-3'-sulphophenylazo)naphthalene-2:4-disulphonic acid | 1:4-diaminobenzene-2-sulphonic acid | Blue. |
| 12 | Copper complex of 2-amino-5-hydroxy-6-(2'-hydroxy-3':5'-disulphophenylazo)naphthalene-7-sulphonic acid | do | Rubine. |
| 13 | 1-(4'-sulphophenyl)-3-carboxy-4-(3''-amino-6''-sulphophenylazo)-5-pyrazolone | 4:4'-diaminodiphenyl-3-sulphonic acid | Greenish yellow. |
| 14 | 1-amino-8-hydroxy-2':7-azonaphthalene-3:4':6:8'-tetrasulphonic acid | 1:4-diaminobenzene-2-sulphonic acid | Bluish red. |
| 15 | 1-amino-8-hydroxy-2':7-azonaphthalene-1':3:5':6-tetrasulphonic acid | do | Do. |
| 16 | 2-(4'-amino-2'-ureidophenylazo)naphthalene-3:6:8-trisulphonic acid | 1:3-diaminobenzene-4-sulphonic acid | Reddish yellow. |
| 17 | 2-(4'-amino-2'-N-acetylaminophenylazo)naphthalene-3:6:8-trisulphonic acid | 1:4-diaminobenzene-2-sulphonic acid | Do. |
| 18 | 2-(4'-amino-2'-N-acetylaminophenylazo)-naphthalene-4:6:8-trisulphonic acid | 1:3-diaminobenzene-4-sulphonic acid | Do. |

| Example | Amino compound | Diamine | Shade |
|---|---|---|---|
| 19 | Copper complex of 2-amino-5-hydroxy-6-(2'-hydroxy-3':5'-disulphophenyl-azonaphthalene-7-sulphonic acid. | 1:4-diaminobenzene-2-sulphonic acid | Rubine. |
| 20 | Copper complex of 2-amino-5-hydroxy-6-(2'-hydroxy-3':5'-disulphophenyl-azo naphthalene-7-sulphonic acid. | 1:4-diaminobenzene-2-sulphonic acid | Do. |
| 21 | Copper complex of 1-amino-2':8-dihydroxy-2':7-azonaphthalene-3:4':6:8'-tetrasulphonic acid. | ....do | Reddish blue. |
| 22 | ....do | ....do | Do. |
| 23 | 1-(4'-sulphophenyl)-3-carboxy-4-(3''-amino-6''-sulphophenylazo)-5-pyrazolone. | 1:3-diaminobenzene-4-sulphonic acid | Greenish yellow. |
| 24 | 1-(3'-aminophenyl)-3-carboxy-4-(1'':5''-disulphonaphth-2''-ylazo)-5-pyrazolone. | 1:4-diaminobenzene-2-sulphonic acid | Do. |
| 25 | Copper complex of 1-amino-1':8-dihydroxy-2':7-azonaphthalene-3:4':6:6':8'-pentasulphonic acid. | ....do | Reddish blue. |
| 26 | 2-(4'-amino-2'-ureidophenylazo)naphthalene-3:6:8-trisulphonic acid | 2:5-diaminobenzoic acid | Reddish yellow. |
| 27 | 2-(4'-amino-2'-methylphenylazo)naphthalene-4:8-disulphonic acid | 1:4-diaminobenzene-2-sulphonic acid | Do. |
| 28 | 1-amino-8-hydroxy-1':7-phenylazonaphthalene-3:6-disulphonic acid | ....do | Red. |
| 29 | Copper complex of 1-amino-8-hydroxy-7(2'-hydroxy-3'-chloro-5'-sulphophenylazo)naphthalene-3:6-disulphonic acid. | ....do | Violet. |
| 30 | 1-amino-4(2':4':6':trimethyl-3'-aminophenylamino)anthraquinone-2:5'-disulphonic acid. | ....do | Blue. |
| 31 | 1:1-mixture of 1-amino-4(4'-amino-3'-sulphophenylamino)anthraquinone-5- (and 8-) sulphonic acids. | ....do | Do. |
| 32 | 4-nitro-4'-aminostilbene-2:2'-disulphonic acid | ....do | Greenish yellow. |
| 33 | 4-nitro-4'-aminodiphenylamine-2-sulphonic acid | 1:3-diaminobenzene-4-sulphonic acid | Reddish yellow. |
| 34 | 4-amino-2'-nitro-diphenylamine-3:4-disulphonic acid | 1:4-diaminobenzene-2-sulphonic acid | Do. |

EXAMPLE 35

The copper complex of 2-amino-5-hydroxy-6-(2'-hydroxy-5-sulphophenylazo)naphthalene-1:7-disulphonic acid is condensed successively with one mol. of cyanuric chloride and 1 mol. of 1:4-diaminobenzene-2-sulphonic acid. 7.9 parts of the tetrasodium salt of the monochlorotriazinyl compound so obtained are dissolved in 200 parts of water and the solution is added to a stirred suspension of 1.5 parts of cyanuric chloride in 20 parts of acetone, 20 parts of crushed ice and 20 parts of water. The mixture is stirred at 5°–10°C. for 1 hour, then neutralized to pH 7.0 with 6 parts of a 10 percent aqueous solution of sodium carbonate. A solution of 7.55 parts of the tetrasodium salt of the secondary condensation product of cyanuric chloride with 1 mole of 2-(2'-ureido-4'-aminophenylazo)naphthalene-3:6:8-trisulphonic acid and 1 mole of 1,4-diaminobenzene-2-sulphonic acid in 200 parts of water is added to the above mixture and the latter is heated at 55°–60 °C. for 7 hours the pH being maintained at 7.0 by the addition of a 10 percent aqueous solution of sodium carbonate. Fifty parts of sodium chloride and 50 parts of potassium chloride are added and the precipitate is filtered off and is then dried.

The dyestuff composition so obtained contains 1.55 atoms of hydrolysable chlorine for each azo group present. When applied to cellulose in conjunction with a treatment with an acid-binding agent the dyestuff yields reddish-brown shades with good fastness to washing and to light.

The following table gives the shades of further dyestuffs which are obtained in similar manner to Example 35 i.e. by forming the secondary condensation product of cyanuric chloride with the amino compound A of column 2 and the diamine A of column 3, and the secondary condensation product of cyanuric chloride with the amino compound B of column 2 and the diamine B of column 3 and reacting equivalent amounts (i.e. one-half mole proportion in the case of that from the 1:2-chromium complex of Example 38 and that from the diamine copper complex of Example 40) of each of these condensation products with cyanuric chloride.

The dyestuffs in which the radicals $D_1-\overline{NR}_1-$ and/or $D_2-NR_6-$ represent azo moieties can in some cases be obtained by coupling. Such dyestuffs fall into the category where the dyestuff radical takes the form

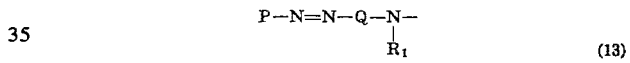

$$P-N=N-Q-N- \atop R_1 \qquad (13)$$

where P is the radical of a diazo component and Q is the radical of a coupling component so that final formation of the dyestuff can take place by coupling a diazotised aromatic amine with an intermediate compound represented by the general formula:

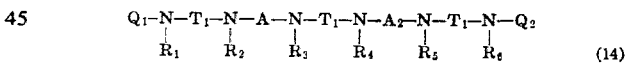

$$Q_1-N-T_1-N-A-N-T_1-N-A_2-N-T_1-N-Q_2 \atop R_1 \quad R_2 \quad R_3 \quad R_4 \quad R_5 \quad R_6 \qquad (14)$$

wherein the symbols $R_1-R_6$, $A_1$, $A_2$ and $T_1$ have the meanings stated above and at least one of $Q_1$ and $Q_2$ represents an aromatic radical capable of coupling with an aromatic diazonium compound, and the other either represents such an aromatic radical or represents a radical as defined by $D_1$ in connection with formula (1).

The intermediate compounds of formula (14) can be obtained by condensing together two moles of a diamine, or one mole of each of two different diamines of formula 2, three moles of cyanuric chloride and either two moles of a coupling component of formula $Q_1-NHR_1$ or one mole of each of two

| Example | Amino compound | Diamine | Shade |
|---|---|---|---|
| 36 | 2-(4'-amino-2'-ureidophenylazo)naphthalene-3:6:8-trisulphonic acid (A). 4-nitro-4'-aminostilbene-2:2'-disulphonic acid (B) | 1:4-diaminobenzene-2-sulphonic acid (A). 1:4-disuminobenzene-2-sulphonic acid (B) | Do. |
| 37 | 2-amino-5-hydroxy-6-(2'-sulpho-4'-methoxyphenylazo)naphthalene-7-sulphonic acid (A). 2-N-methylamino-5-hydroxy-6-(2'-sulpho-4'-methoxyphenylazo)naphthalene-7-sulphonic acid (B). | 1:3-diaminobenzene-6-sulphonic acid (A). 1:4-diaminobenzene-2-sulphonic acid (B) | Scarlet. |
| 38 | 1:2-copper complex of 2-amino-5-hydroxy-6-(2'-carboxyphenylazo)naphthalene-7-sulphonic acid (A). 4-nitro-4'-aminostilbene-2:2'-disulphonic acid (B) | 1:4-diaminobenzene-2-sulphonic acid (2 mols) (A). 1:4-diaminobenzene-2-sulphonic acid (2 mols) (B). | Brown. |
| 39 | Copper complex of 1-amino-1':8-dihydroxy 2':7-azonaphthalene-3:4':6:8'-tetrasulphonic acid (A). 2-(4'-amino-2'-ureidophenylazo)naphthalene-3:6:8-trisulphonic acid (B) | 1:3-diaminobenzene-6-sulphonic acid (A). 1:4-diaminobenzene-2-sulphonic acid (B) | Olive green. |
| 40 | Copper complex of 2-amino-5-hydroxy-6-(2'-hydroxy-3-amino-5'-sulphophenylazo) naphthalene-1:7-disulphonic acid (A). 4-nitro-4'-aminostilbene-2:2'-disulphonic acid (A) | 1:4-diaminobenzene-2-sulphonic acid (2 mols) (A). 1:4-diaminobenzene-2-sulphonic acid (2 mols) | Reddish brown. | different coupling components of formula $Q_1$—$NHR_1$ or one mole of a coupling component of formula $Q_1$—$NHR_1$ and one mole of a water-soluble colored compound of formula $D_1$—$NHR_1$.

As examples of diamines of formula (2) there may be mentioned:

1:4-phenylenediamine-2-sulphonic acid, 1:3-phenylenediamine-4-sulphonic acid, 2-methyl-1:4-phenylenediamine-6-sulphonic acid, 2-methyl-1:5-phenylenediamine-4-sulphonic acid, 2:6-diaminotoluene-4-sulphonic acid, 2-methyl-1:5-phenylenediamine-3-sulphonic acid, 4:4'-diamino stilbene-2:2'-disulphonic acid, 4,4'-diaminodiphenyl-3-sulphonic acid, 2:6-diamino-naphthalene-4:8-disulphonic acid and 1:4-diaminonaphthalene-2-sulphonic acid.

As examples of coupling components of formula $Q_1$—$NHR_1$, there may be mentioned aminonaphthol sulphonic acids and amino-pyrazolones e.g. 1-amino-8-naphthol-3,6- and 4,6-disulphonic acids, 2-amino-5-naphthol-7-sulphonic acid, 2-amino-5-naphthol-1,7-disulphonic acid, 2-amino-8-naphthol-6sulphonic acid, 2-amino-8-naphthol-3,6-disulphonic acid, 2-(4'-amino anilino)-8-naphthol-3',6-disulphonic acid and the N-methyl derivatives of these, 1-(3'-aminophenyl)-3-methyl and -3-carboxy-5-pyrazolones, 1-(4'-aminophenyl)-3-methyl- and -3-carboxy-5-pyrazolones, 1-(3'-amino-4'-sulphophenyl)-3-methyl- and -3-carboxy-5-pyrazolones, 1-(4'-amino-3'-sulphophenyl)-3-methyl- and -3-carboxy-5-pyrazolones, 1-(2-methyl-5'-sulpho-3'-aminophenyl)-3-methyl- and -3-carboxy-5-pyrazolones, and 1-(2'chloro-3'-amino-5'-sulphophenyl)-3-methyl- and -3-carboxy-5-pyrazolones.

The above process can conveniently be carried out in aqueous medium, the condensations being carried out, in general, at 0° – 10°C. for replacement of the first chlorine atom of the cyanuric chloride and at 30°–50°C. for replacement of the second chlorine atom. In general, the condensations should be carried out at from pH3 to pH 6.5, depending on the amino compound concerned; it is advisable to use the more acid end of this range for aminonaphthols having a tendency to condense on the OH group as well as the amino group. The couplings should be carried out at as low a temperature and as low a pH as will operate efficiently to avoid hydrolysis of chlorine from the triazine nucleus.

The following Example and table illustrate the above process.

EXAMPLE 41

A solution of 26.1 parts of the sodium salt of 2-amino-5-naphthol-7-sulphonic acid in 200 parts of water is added to a suspension of 18.4 parts of cyanuric chloride in 200 parts of acetone 150 parts of ice and 150 parts of water and the mixture is stirred for 1 hour at 0°–5°C. A 10 percent solution of sodium carbonate is added to bring the pH of the mixture to 6.7 – 7 and stirring is continued for a further 1½ hours, the pH being maintained at 6.5 – 7 by further additions of sodium carbonate solution when necessary. A neutral solution of 21.3 parts of the sodium salt of 1:4-phenylenediamine-2-sulphonic acid in 200 parts of water is added and the mixture is heated at 35° – 40°C. for 2 hour of pH being maintained at 7 by addition of a 10 percent aqueous solution of sodium carbonate, 80 parts of sodium chloride are added and the precipitate is filtered off.

A solution of 29.1 parts of the disodium salt of the compound so obtained in 300 parts of water is added to a suspension of 4.6 parts of cyanuric chloride in 50 parts of acetone, 40 parts of ice and 40 parts of water and the mixture is stirred for one-half hour at 0°–5°C. A 10 percent aqueous solution of sodium carbonate is added to bring the pH to 7 and the mixture is stirred for a further 2 hours the pH being maintained at 7 by further addition of sodium carbonate when necessary. The mixture is then heated at 40°–45°C. for 4 hours the pH being maintained at 7 by additions of sodium carbonate solution. The mixture is cooled to 0°–50°C and the diazonium salt from 11 parts of 4-methoxyaniline-2-sulphonic acid is added together with sufficient sodium carbonate to hold the pH of the mixture at 7 and the latter is stirred for 4 hours. One hundred twenty parts of sodium chloride are added and the precipitate is filtered off and dried.

The dyestuff composition so obtained contains 1.45 atoms of hydrolysable chlorine for each azo group present. When applied to cellulose textile materials in conjunction with a treatment with an acid binding agent the dye yields scarlet shades having good fastness to light and to wet treatments.

The following table describes further Examples of the invention, obtained in similar manner to Example 41 by condensing cyanuric chloride with 1 mole of the diamine named in column 2 and one mole of the coupling component named in column 3, thereafter condensing cyanuric chloride with 2 moles of the resultant amino compound and finally coupling the product with 2 moles of the diazonium compound of the amine named in column 4. The shade of material colored by the dyestuff is stated in column 5.

The invention also provides a process for manufacture of the new dyestuffs in which the dyestuff radical $D_1$ $NHR_1$ — takes the form:

$$P — N = N — Q — NR_1 \qquad (13)$$

where P— is the radical of a diazo component and —Q—$NR_1$ is the radical of a coupling component which comprises condensing cyanuric chloride, in either order, with one mole of the coupling component and one mole of a diamine of formula

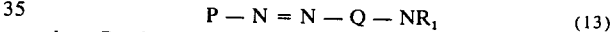

and coupling with the diazonium salt of an aromatic amine of formula P $NH_2$ after the first or second condensation step and thereafter condensing one mole of cyanuric chloride with two moles of the resulting compound of formula

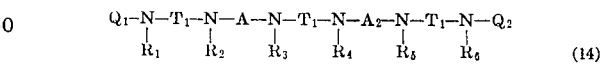

or with 1 mole of this compound and with 1 mole of a compound of formula:

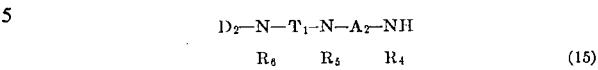

wherein $A_2, D_2, R_4, R_5, R_6$ and $T_1$ have the meanings stated above. As examples of diamines of formula (2) there may be mentioned:

1:4-phenylenediamine-2-sulphonic acid, 1:3-phenylenediamine-4-sulphonic acid, 2-methyl-1:4phenylenediamine-6-sulphonic acid, 2-methyl-1:5-phen-

| Ex. | Diamine | Coupling compoenent | Diazo component | Shade |
|---|---|---|---|---|
| 42 | 1,4-phenylene diamine-2-sulphonic acid | 2-methylamino-5-naphthol-7-sulphonic acid | 2-naphthylamine-1,5-disulphonic acid | Reddish orange. |
| 43 | 1,3-phenylene diamine-4-sulphonic acid | do | do | Do. |
| 44 | do | do | 4-methoxyaniline-2-sulphonic acid | Scarlet. |
| 45 | 1,4-phenylene diamine-2-sulphonic acid | 1-amino-8-naphthol-3,6-disulphonic acid | 2-naphthyl amine-sulphonic acid | Bluish red. |
| 46 | do | do | Aniline-2-sulphonic acid | Red. |
| 47 | do | do | 2-naphthylamine-4,8-disulphonic acid | Bluish red. |
| 48 | do | do | 2-naphthylamine-1,5-disulphonic acid | Do. |
| 49 | do | do | Aniline | Red. | ylenediamine-4-sulphonic acid,2:6-diaminotoluene-4-sulphonic acid, 2-methyl-1:5-phenylenediamino-3-sulphonic acid, 4:4'-diamino stilbene-2:2'-disulphonic acid, 4,4'-diaminodiphenyl-3-sulphonic acid, 2:6-diamino-naphthalene-4:8-disulphonic acid and 1:4-diaminonaphthalene-2-sulphonic acid.

As examples of coupling components of formula Q$_1$—NHR$_1$, there may be mentioned aminonaphthol sulphonic acids and aminopyrazolones e.g. 1-amino-8-naphthol-3,6- and 4,6-disulphonic acids, 2-amino-5-naphthol-7-sulphonic acid, 2-amino-5-naphthol-1,7-disulphonic acid, 2-amino-8-naphthol-6-sulphonic acid, 2-amino-8-naphthol-3,6-disulphonic acid, 2-(4'amino anilino)-8-naphthol-3',6-disulphonic acid and the N-methyl derivatives of these, 1-(3'-aminophenyl)-3-methyl- and -3-carboxy-5-pyrazolones, 1-(4'-aminophenyl)-3-methyl- and -3-carboxy-5-pyrazolones, 1-(3'-amino-4'-sulphophenyl) -3-methyl- and -3-carboxy-5-pyrazolones, 1-(4'-amino-3'-sulphophenyl) -3-methyl-and-3-carboxy-5-pyrazolones, 1-(2'-methyl-5'-sulpho-3'-aminophenyl) -3-methyl- and -3-carboxy-5-pyrazolones, and 1-(2'-chloro-3'-amino-5'-sulphophenyl)-3-methyl- and -3-carboxy-5-pyrazolones.

The above process can conveniently be carried out in aqueous medium, the condensations being carried out, in general, at 0°–10°C for replacement of the first chlorine atom of the cyanuric chloride and at 30°–50°C for replacement of the second chlorine atom. In general, the condensations should be carried out at from pH 3 to pH6.5, depending on the amino compound concerned; it is advisable to use the more acid end of this range for amino-naphthols having a tendency to condense on the OH group as well as the amino group. The couplings should be carried out at as low a temperature and as low a pH as will operate efficiently to avoid hydrolyse's of chlorine from the triazine nucleus.

The following Examples and tables illustrate this process:

EXAMPLE 50

A solution of 36.3 parts of the disodium salt of 1 amino-8-naphthol-3:6-disulphonic acid in 100 parts of water is added with stirring to a suspension of 18.4 parts of cyanuric chloride in 200 parts of acetone, 105 parts of ice and 100 parts of water and the mixture is stirred at 0°–5°C for 1 hour when no diazotisable amine is present in the reaction mixture. A suspension of the diazonium salt from 30.3 parts of 2-naphthylamine-1:5-disulphonic acid in 450 parts of water is added together with sodium carbonate to bring the pH up to 6 over one-half hour. The coupling mixture is then stirred for a further 1 hour when a neutral solution of 21.5 parts of the sodium salt of 1:4-phenylenediamine-2-sulphonic acid in 300 parts of water is added. The mixture is then stirred at 40°–45 °C for 3 hours the pH being maintained at 6–6.5 by the addition of a 10 percent aqueous solution of sodium carbonate. 120 parts of sodium chloride and 120 parts of potassium chloride are added and the precipitate is filtered off.

A solution of 10.4 parts of the penta sodium salt of the amino compound so obtained in 200 parts of water is added with stirring to a suspension of 1.84 parts of cyanuric chloride in 10 parts of acetone, 20 parts of ice and 20 parts of water and the mixture is stirred at 0°–5°C for 2 hours. The pH of the mixture is then raised to 6.5–7 over one-half hour by the gradual addition of a 10 percent aqueous solution of sodium carbonate and the mixture is stirred for a further 1½ hours. A further solution of 10.4 parts of the penta sodium salt of the amino compound (obtained as described in paragraph 1) in 200 parts of water is added and the mixture is heated at 45°–50C for 3 hours the pH being maintained at 7 by the addition of a 10 percent aqueous solution of sodium carbonate. Fifty parts of sodium chloride and 50 parts of potassium chloride are added and the precipitate is filtered off.

The dyestuff composition so obtained contains 1.45 reactive chlorine atoms for each azo group present. When applied to cellulose textile materials in conjunction with a treatment with an acid-binding agent the dyestuff yields bluish red shades having good fastness to light and to wet treatments.

EXAMPLE 51

To a solution of 51.1 parts of the disodium salt of 1-(N-2':4' dichlorotriazin-6'ylamino)-8-naphthol-3:6-disulphonic acid in 500 parts of water prepared as described in Example 51, there is added a neutral solution of 21.5 parts of the sodium salt of 1:4-phenylene diamine-2-sulphonic acid in 300 parts of water and the mixture is heated at 35°–40°C for two hours, the pH being maintained at 3.6–4 by the careful addition of sodium carbonate. The solution is cooled to 0°–5°C and there is added a suspension of the diazonium salt from 17.3 parts of aniline-2-sulphonic acid together with sufficient sodium carbonate to raise the pH to 6.5 and the mixture is stirred for 2 hours at 0°–5°C. Ninety Parts of sodium chloride and 90 parts of potassium chloride are added and the precipitate is filtered off.

A solution of 15.8 parts of the tetrasodium salt of the compound so obtained in 20 parts of water is added to a suspension of 1.84 parts of cyanuric chloride in 10 parts of acetone, 20 parts of ice and 20 parts of water and the mixture is stirred at 0°–5°C for 2 hours. The pH of the mixture is raised to 6.5 and stirring is continued for a further 2 hours. The mixture is then heated at 45°–50°C for 3 hours the pH of the mixture being maintained at 7 by the addition of a 10 percent aqueous solution of sodium carbonate. Forty parts of sodium chloride are added and the precipitate is filtered off and dried.

The dyestuff composition so obtained contains 1.4 atoms of hydrolysable chlorine for each azo group present. When applied to cellulose textile materials in conjunction with a treatment with an acid-binding agent, the dye yields red shades having good fastness to light and to wet treatments.

The following table describes further examples, obtained in similar manner to Example 50 or 51 by condensing cyanuric chloride with one mole of the diamine of column 2 and one mole of the coupling component of column 3, coupling with the diazonium salt of the amine of column 4 and condensing two moles of the resultant compound with cyanuric chloride. The shade of material colored by the dyestuff is stated in column 5.

| Ex. | Diamine | Coupling component | Diazo component | Shade |
|---|---|---|---|---|
| 52 | do | 2-amino-5-naphthol-7-sulphonic acid | 4-methoxyaniline-2-sulphonic acid | Scarlet. |
| 53 | 1,3-phenylene diamine-2-sulphonic acid | 2-methylamino-5-naphthol-7-sulphonic acid | do | Do. |
| 54 | do | do | 2-naphthylamine-1,5-disulphonic acid | Reddish-orange. |
| 55 | 1,4-phenylene diamine-2-sulphonic acid | do | do | Do. |
| 56 | do | 1-amino-8-naphthol-3,6-disulphonic acid | 2-naphthylamine-1-sulphonic acid | Bluish-red. |
| 57 | do | do | 2-naphthylamine-4,8-disulphonic acid | Do. |
| 58 | do | do | Aniline | Red. |

EXAMPLE 59

1-amino-8-naphthol-3,6-disulphonic acid is condensed with cyanuric chloride, the product coupled with diazotised 2-naphthylamine-1,5-disulphonic acid and then condensed with 1,4-phenylene diamine-2-sulphonic acid as described in Example 50, and 10.4 parts of the resultant product are condensed with 1.84 parts of cyanuric chloride as described therein.

To the resultant solution there is added a solution of 9.4 parts of the tetra sodium salt of the condensation product of cyanuric chloride with one mole of 1,4-phenylene diamine -2- sulphonic acid and 1 mole of 1-amino-8-hydroxy-2',7-azonaphthalene,-1',3,6-trisulphonic acid in 200 parts of water and the mixture is thereafter condensed in a similar manner to the final stage of Example 50.

The resulting dyestuff gives bluish red shades.

EXAMPLE 60

A solution of 26.1 parts of the sodium salt of 2-amino-5-naphthol-7-sulphonic acid in 200 parts of water is added to a suspension of 18.4 parts of cyanuric chloride in 200 parts of acetone, 150 parts of ice and 150 parts of water and the mixture is stirred at 0°–5°C. for 1 hour. Dilute sodium carbonate solution is then added to bring the pH to 6.5 and stirring is continued for 90 minutes, keeping the pH at 6.5–7 by further additions of sodium carbonate solution. A neutral solution of 21.3 parts of the sodium salt of 1,3-phenylene diamine-4-sulphonic acid in 200 parts of water is added and the mixture is heated at 35°–40°C. for 2 hours keeping the pH at 7 by further additions of sodium carbonate solution. The mixture is cooled to 0° – 5°C. and a suspension of the diazonium salt from 15.8 parts of orthanilic acid in 200 parts of water is added. The pH is brought to 7 by addition of dilute caustic soda and the mixture is stirred for 4 hours. Salt is then added to precipitate the product, which is filtered off and dried.

A solution of 7.68 parts of the trisodium salt of the resultant product in 200 parts of water cooled to 0°–5°C is added to a suspension of 1.84 parts of cyanuric chloride in 10 parts of acetone, 20 parts of ice and 20 parts of water and the mixture is stirred at 0°–5°C. for 2 hours. The pH is then raised to 6.4–7 over 30 minutes by adding 10 percent sodium carbonate solutions and the mixture is stirred for a further 30 minutes.

To the resulting solutions there is added a solution of 9.34 parts of the tetra sodium salt of the condensation product of cyanuric chloride with one mole of 1,4-phenylene diamine-2-sulphonic acid and 2-methylamino-5-hydroxy-2',6-azonaphthalene-1',5',7-trisulphonic acid in 200 parts of water and the mixture is stirred at 55°–40°C. and pH 6.5–7 for 4 hours.

The dyestuff obtained by addition of salt, filtration and drying yields orange shades.

EXAMPLE 61

Proceeding in a similar manner in Example 59, 1-amino-8-naphthol-3,6-disulphonic acid is condensed with cyanuric chloride and the product is coupled with diazotised orthanilic acid and then condensed with 1,4-phenylene diamino-2-sulphonic acid.

1.84 parts of cyanuric chloride are condensed successively with 8.9 parts of the resultant product and 7.98 parts of the condensation product of cyanuric chloride with 1 mole of 1,3-phenylene diamine-4-sulphonic acid and 1 mole of 2-amino-6-(4'-methoxyphenylazo)-5-naphthol-2', 7-disulphonic acid. The resulting dyestuff gives red shades.

The invention also provides a process for manufacture of the dyestuffs in which $D_-$ represents the radical of a copper complex monoazo compound which comprises subjecting a dyestuff of the formula:

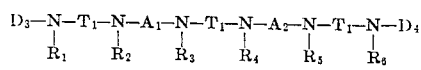

in which $A_1$, $A_2$, $R_1$ - $R_6$ and $T_1$ have the meanings stated in connection with formula (1), $D_3$ represent the radical of a monoazo compound having a o,o$^1$-dihydroxyazo or o-hydroxy-o'-carboxyazo grouping, and $D_4$ has the meaning stated for $D_3$ or for $D_1$ of formula 1, to the action of copper-yielding agent, especially copper sulphate.

This process may be carried out by stirring a mixture of the dyestuff and the metal-yielding agent in an aqueous medium at elevated temperatures e.g. from 30° to 90°C., maintaining the pH at from 5 to 7 to lessen the possibility of hydrolysis of the chlorine atoms on the triazine nuclei.

The process is illustrated by the following Example:

EXAMPLE 62

One molecular proportion of cyanuric chloride is condensed successively with one molecular proportion of 1-(3'aminophenyl)-3-methyl-4(2'carboxy-4'sulphophenylazo)-5 pyrazolone, and one molecular proportion of 1:4phenylene diamine-2sulphonic acid and the 2 molecular proportions of the compound so obtained are condensed with one molecular proportion of cyanuric chloride by the general method described for Example 1.

16.8 Parts of the hexasodium salt of the compound so obtained are dissolved in 200 parts of water and the pH of the solution is brought to 6.8 by the adding of acetic acid. 24 Parts of a 2N aqueous copper sulphate solution are added and the mixture is heated at 60°C., for 20 minutes. Fourty parts of sodium chloride are added and the precipitate is filtered off and dried.

The dyestuff composition so obtained contains 1.5 atoms of hydrolysable chlorine for each azo group present. When applied to cellulose textile materials in conjunction with a treatment with an acid-binding agent, the dye yields dull yellow shades having good fastness to light and to washing.

The invention also provides a process for manufacture of the new dyestuff in which $D_1$ represents the radical of a copper complex of a o, o'-dihydroxy monoazo compound of the azonaphthalene or phenylazonaphthalene series, which comprises subjecting a dyestuff of formula (1) in which $A_1$, $A_2$, $R_1$—$R_6$ and $T_1$ have the meanings stated, and $D_1$ and $D_2$ each represent a monoazo compound of the 2-phenylazo-1-naphthol or 2-naphthylazo-1-naphthol series to the action of a copper salt in the presence of an oxidizing agent.

This process may conveniently be carried out in aqueous medium at a pH of about 4 to 5 (e.g. in the presence of an acetic acid/sodium acetate buffer) at a temperature within the range of 10° to 70°C. Suitable oxidizing agents include, for example, alkali metal peroxides, percarbonates, perborates, organic peracids, acylperoxides or air in the presence of oxygen-transferring catalysts e.g. anthraquinone-2-sulphonic acid or deca-hydronaphthalene. The preferred oxidizing agent is hydrogen peroxide.

Preferably the radical $D_1$ of the dyestuffs used in this process is a 1-hydroxy-2,2'-azonaphthalene radical having two sulphonic acid groups on each naphthalene nucleus, those on the hydroxyl-free nucleus preferably being attached to the nucleus in the 4' to 8' positions e.g. a 5', 7'-disulpho- or above all a 4' 8' disulpho-naphth-2'-yl radical.

The following example is illustrative of this process:

EXAMPLE 63

To a solution of 19.8 parts of the dyestuff of Example 14, in 150 parts of water at pH 3.5–74.0 there are added 24 parts of 2N aqueous copper sulphate solution followed by sufficient sodium acetate to raise the pH to 4.5. The temperature of the mixture is raised to 30°C with stirring and there are added 60 parts of 20 vols. hydrogen peroxide. The mixture is stirred 1 hr. at 30°C. when the blue copper complex is formed. The pH of the mixture is then raised to 7.0 by addition of sodium carbonate and the mixture is screened. The filtrates we treated with 40 parts of sodium chloride, filtered and dried.

The dyestuff, so obtained, contains 1.4 atoms of hydrolysable chlorine for each azo group present. When applied to cellulose textile materials in conjunction with a treatment with an acid-binding agent the dye yields reddish-blue shades having excellent fastness to washing and to light.

The new dyestuffs can be isolated by the usual techniques adapted for isolation of water-soluble reactive dyestuffs, for example, by salting out or spray drying the reaction mixture in which the dyestuff has been formed. If desired, stabilizers, for example alkali metal hydrogen phosphates, may be added.

The new water-soluble dyestuffs are valuable for coloring cellulose textile material, for example, textile materials comprising natural or regenerated cotton. For coloring such textile materials, the new dyestuffs are preferably applied, either by a dyeing or printing process, to the cellulose textile materials in conjunction with a treatment with an acid-binding agent, for example sodium hydroxide, sodium carbonate or sodium bicarbonate which may be applied to the cellulose textile material before, during or after the application of the dyestuffs. Alternatively when the coloration process involves the use of a heating step a substance can be used, for example, sodium trichloroacetate, which is changed into an acid-binding agent during the heating step. When so applied to cellulose textile materials the new dyestuffs react with the cellulose and provide a wide variety of shades having good fastness to light and to wet treatments especially to sever washing. They are notable for the high proportion which reacts when applied from saline dyebaths in the beck, or on the jig or winch.

We claim:

1. A dyestuff of the formula

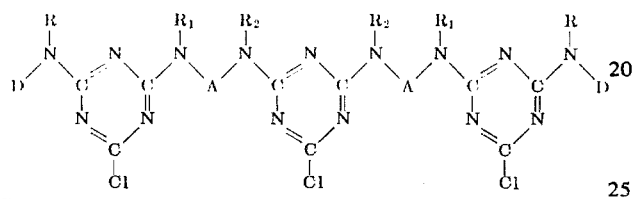

wherein R, $R_1$ and $R_2$ each independently are selected from the group consisting of hydrogen and $-CH_3$ A is selected from the group consisting of sulphophenylene, carboxyphenylene and sulphodiphenylene, and D represents a member selected from the group consisting of $A_1-N=N-E_1-$, $E_2-N=N-A_2-$ and

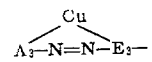

wherein $A_1$ is selected from the group consisting of phenyl, sulphophenyl, methoxysulphophenyl, sulphonaphthyl, disulphonaphthyl and trisulphonaphthyl, $E_1$ is selected from the group consisting of 1,4-phenylene, 1,4-phenylene wherein the benzene nucleus is substituted by a member selected from the group consisting of $-CH_3$, $CH_3CONH-$ and $NH_2CONH-$, and mono- or disulpho hydroxy naphthylene, $A_2$ is sulphophenylene, $E_2$ is 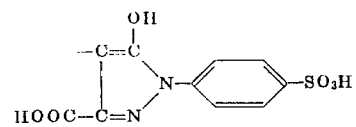

$A_3$ represents a member selected from the group consisting of sulpho-1,2-oxyphenylene, sulpho-1, 2-oxyphenylene wherein the benzene nucleus is mono substituted with a member selected from the group consisting of Cl and $SO_3H$, and di- or tri-sulpho-1,2-oxynaphthalene, and $E_3$ is selected from the group consisting of mono- or disulphohydroxynaphthylene.

2. The dyestuff of claim 1 having the formula:

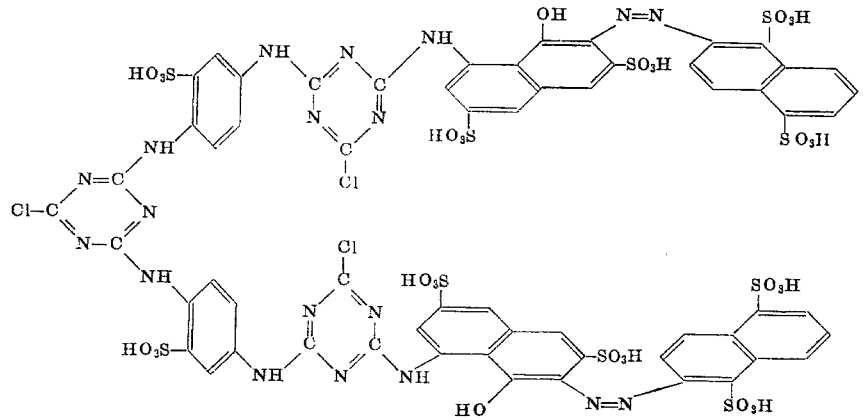

3. The dyestuff of claim 1 having the formula

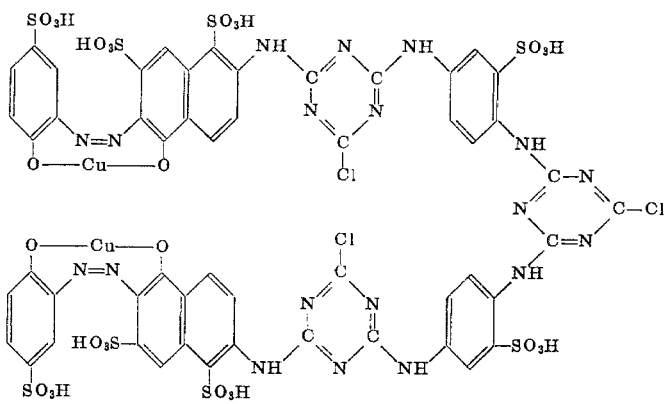

4. A dyestuff as claimed in claim 1 having the formula:
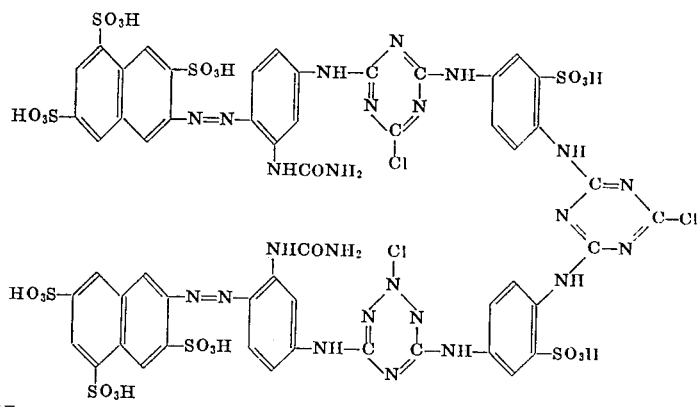
5. A dyestuff as claimed in claim 1 having the formula:
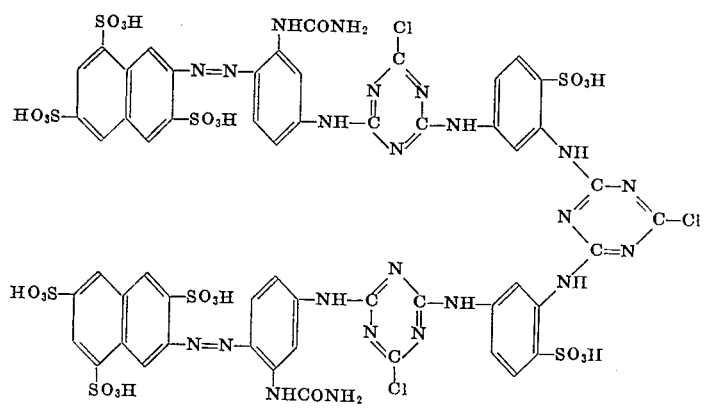
6. A dyestuff as claimed in claim 1 having the formula:
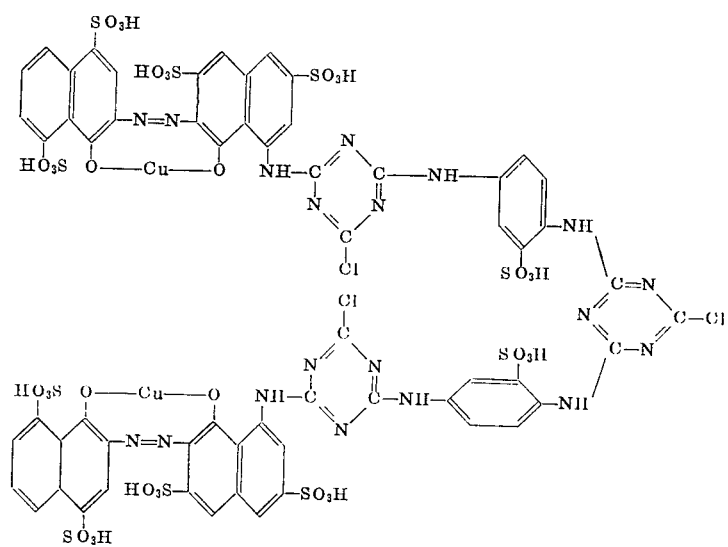
* * * * *